US010442365B2

(12) United States Patent
Bauch et al.

(10) Patent No.: US 10,442,365 B2
(45) Date of Patent: Oct. 15, 2019

(54) APPARATUS AND METHODS FOR VEHICLE STRUCTURAL OR SEMI-STRUCTURAL COMPONENT ASSEMBLY ENABLING TUNABLE DECELERATION CHARACTERISTICS

(71) Applicant: Ford Global Technologies, LLC, Dearborn, MI (US)

(72) Inventors: David James Bauch, South Lyon, MI (US); Patrick James Blanchard, Ann Arbor, MI (US); Glen Smith, Dearborn, MI (US); Michael Cacovic, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1095 days.

(21) Appl. No.: 14/303,725

(22) Filed: Jun. 13, 2014

(65) Prior Publication Data
US 2015/0360634 A1 Dec. 17, 2015

(51) Int. Cl.
*B60R 21/013* (2006.01)
*B60R 11/00* (2006.01)
(Continued)

(52) U.S. Cl.
CPC ............ *B60R 11/00* (2013.01); *B29C 70/023* (2013.01); *B29C 70/74* (2013.01); *B60R 19/483* (2013.01);
(Continued)

(58) Field of Classification Search
CPC ............ B60R 21/0132; B60R 21/0136; B29C 45/1671; B60Q 9/00
See application file for complete search history.

(56) References Cited

U.S. PATENT DOCUMENTS 5,065,322 A   11/1991  Mazur et al.
5,269,574 A * 12/1993  Bhutani ................. B60R 19/18
                                                                293/102
(Continued)

FOREIGN PATENT DOCUMENTS

EP    1031467 B1    2/2005
EP    1582414 B1    5/2007
EP    1644225 B1   11/2009

OTHER PUBLICATIONS http://www.speautomotive.com/Awards Modules/2009Awards/ Process Assembly Enabling/Bolster.pdf; "Hybrid-Composite Bolster with Glass-Mat Reinforcement"; Accessed Jun. 12, 2014.
(Continued)

*Primary Examiner* — Bradley Duckworth
(74) *Attorney, Agent, or Firm* — Ray Coppiellie; McCoy Russell LLP

(57) ABSTRACT

A vehicle structural or semi-structural component assembly or crash sensor assembly includes a body, wherein a first portion of the body comprises a polymer composite material and a sensor mount portion of the body is connected to the first portion; and a sensor directly attached to the sensor mount portion. The sensor mount portion comprises a polymer composite material and a flexible reinforcement material over-molded within the polymer composite material. A method for enabling tunable deceleration characteristics in a vehicle structural or semi-structural component assembly includes forming a structural or semi-structural component for a vehicle from a polymer composite material; over-molding a flexible reinforcement material within the polymer composite material at one or more locations along the component; and attaching a sensor directly to at least one of the one or more locations.

23 Claims, 16 Drawing Sheets

(51) Int. Cl.
  *B29C 70/02* (2006.01)
  *B60R 19/48* (2006.01)
  *B29C 70/74* (2006.01)
  *B29K 23/00* (2006.01)
  *B29K 309/08* (2006.01)
  *B60R 21/0136* (2006.01)

(52) U.S. Cl.
  CPC ...... *B29K 2023/10* (2013.01); *B29K 2309/08* (2013.01); *B60R 21/0136* (2013.01); *Y10T 29/49819* (2015.01); *Y10T 29/49886* (2015.01)

(56) References Cited

U.S. PATENT DOCUMENTS

| | | | |
|---|---|---|---|
| 5,814,897 A | 9/1998 | Ito et al. | |
| 5,822,922 A * | 10/1998 | Grumm | B60J 1/1853 49/360 |
| 7,098,778 B1 * | 8/2006 | Zoratti | B60R 21/013 280/728.1 |
| 7,275,775 B2 | 10/2007 | Park et al. | |
| 7,328,608 B2 * | 2/2008 | Kashiwai | B60C 23/0408 73/146 |
| 7,350,851 B2 | 4/2008 | Barvosa-Carter et al. | |
| 7,488,904 B2 * | 2/2009 | Maegawa | B29C 45/1671 174/521 |
| 7,633,301 B2 * | 12/2009 | Steenwyk | B60N 2/002 324/457 |
| 7,753,419 B2 * | 7/2010 | Kondo | B60R 19/483 180/274 |
| 8,256,279 B2 * | 9/2012 | Siegenthaler | G01L 23/10 73/114.16 |
| 9,221,974 B2 * | 12/2015 | Rexin | C08L 77/00 |
| 2002/0064649 A1 * | 5/2002 | Lembke | G01F 1/684 428/336 |
| 2006/0061008 A1 * | 3/2006 | Karner | B29C 45/0017 264/250 |
| 2008/0284273 A1 * | 11/2008 | Purvines | H01R 13/6608 310/418 |
| 2009/0206218 A1 * | 8/2009 | Massey | B60B 7/02 248/220.21 |
| 2011/0158287 A1 * | 6/2011 | Clark | G01D 11/245 374/185 |
| 2013/0031963 A1 * | 2/2013 | Ritchie, Jr. | G01N 33/2847 73/61.43 |
| 2013/0056100 A1 * | 3/2013 | Imaizumi | B60T 13/662 137/560 |

OTHER PUBLICATIONS

Automotive Plastics; "Front End Bolster"; http://www.plastics-car.com/structure; May 23, 2012.

* cited by examiner

APPARATUS AND METHODS FOR VEHICLE STRUCTURAL OR SEMI-STRUCTURAL COMPONENT ASSEMBLY ENABLING TUNABLE DECELERATION CHARACTERISTICS

BACKGROUND

Embodiments described herein relate to apparatus and methods for vehicle structural or semi-structural components enabling tunable deceleration characteristics therein. For example, embodiments described herein relate to a vehicle structural or semi-structural component comprising a body, wherein at least a portion of the body includes a flexible reinforcement material over-molded within a polymer composite material.

Crash sensors are mounted on the vehicle structural or semi-structural components for detecting deceleration due to a crash in order to deploy safety devices such as, for example, air bags. As such there is a continued need for improved safety device deployment control.

SUMMARY

In one embodiment, a vehicle structural or semi-structural component assembly or crash sensor assembly includes a body, wherein a first portion of the body comprises a polymer composite material and a sensor mount portion of the body is connected to the first portion; and a sensor directly attached to the sensor mount portion. The sensor mount portion comprises a polymer composite material and a flexible reinforcement material over-molded within the polymer composite material.

In another embodiment, a crash detection assembly includes a vehicle structural or semi-structural component configured to enable tunable deceleration characteristics and having a body, wherein a first portion of the body comprises a polymer composite material, and a sensor mount portion of the body is connected to the first portion, wherein the sensor mount portion comprises a polymer composite material and a flexible reinforcement material over-molded within the polymer composite material. The crash detection assembly further includes a crash sensor connected directly to the sensor mount portion.

In another embodiment, a method for enabling tunable deceleration characteristics in a vehicle structural or semi-structural component assembly includes forming, using a mold, a structural or semi-structural component for a vehicle from a polymer composite material; over-molding a flexible reinforcement material within the polymer composite material at one or more locations with the mold to form one or more locations along the component; and attaching a sensor to at least one of the one or more locations comprising the flexible reinforcement material.

In yet another embodiment, a method of retrofitting a vehicle structure or semi-structural component assembly comprises removing an existing metal sensor mount from an existing vehicle structure or semi-structural component; replacing the existing metal sensor mount with a new sensor mount comprising a polymer composite material having a flexible, reinforcement material in-molded therein; and mounting a crash sensor on the new sensor mount.

Other features and advantages of the disclosure will be apparent from the following description, the accompanying drawings, and the appended claims.

DETAILED DESCRIPTION

Figure 1:
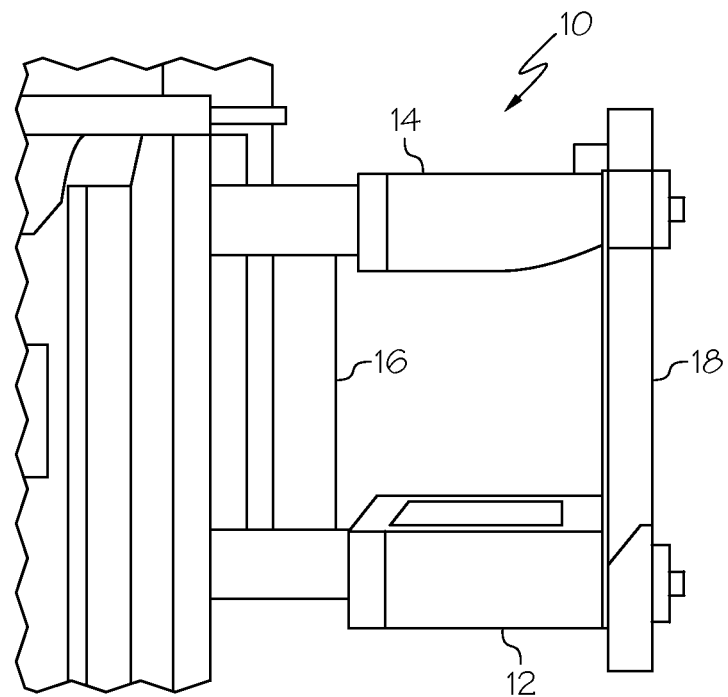
FIG. 1 is a schematic illustration of a side elevational view of a test fixture, holding a test coupon prior to a dynamic bending test.

Vehicle structural or semi-structural components shown and described herein include, but are not limited to, front end bolsters, side rails, bumpers, bumper supports, body sides, frame connectors, shotgun rails, spare tire wheel tubs and/or any other body part that absorbs or transfers impact energy and/or any part or component that a sensor may be attached thereto. Illustrative vehicles may include automobiles, motorcycles, airplanes, helicopters, or any other types of vehicles. In certain examples, one or more sensors may be directly mounted, attached, and/or connected to the vehicle structural or semi-structural component at one or more locations along the component to form a vehicle structural or semi-structural component assembly. The sensor(s) may be operable to measure and/or detect a crash, i.e., a crash sensor such as, for example, a sudden deceleration, in order to deploy and/or activate a safety device such as, for example, one or more air bags or the locking of seat belt restraints. Illustrative crash sensors may include, but not be limited to accelerometers, pressure transducers, thermocouples, load cells, deflection and contact sensors, and/or any other type of sensor that may be used for function of deployment of safety devices during a crash. The vehicle structural or semi-structural component with one or more crash sensors directly mounted, attached, and/or connected to one or more locations along the component may form a crash detection assembly. In certain embodiment, the component is configured to enable tunable deceleration characteristics.

As used herein, the term "sensor mount" means at least a portion of a vehicle structural or semi-structural component and/or framework that is configured to receive, to support, be connected to, have affixed thereto, and/or have mounted thereto one or more sensors, particularly one or more crash sensors for monitoring acceleration and/or deceleration of a vehicle due to a crash. The sensor mount may be a separate and discreet part that is connected or attached to the vehicle structural or semi-structural component, or it may be fabricated such that is it integral to and/or part of the vehicle structural or semi-structural component. As will be shown herein, the vehicle structural or semi-structural component may include one or more sensor mounts. In one or more embodiments shown and described herein, the sensor mount(s) do not include or comprise a monolithic metal plate and/or substrate.

The sensor mounts shown and described herein may be fabricated from a polymer material such as, for example, a polymer composite material. In certain examples, the polymer composite material may include, but not be limited to, including but not limited to glass mat thermoplastic and/or any other reinforced polymer. In one embodiment of the polymer composite material, the material includes a 40% by weight long glass thermoplastic-polypropylene (LFT-PP). In another embodiment, the polymer composite material may comprise a 40% by weight glass direct-long glass thermoplastic polypropylene (DLFT-PP) reinforced with three (3) layers of 70% unidirectional glass mat (in 0°/90° orientations). It is understood that other plastic, polymer, and/or composite materials may be used.

In certain embodiments, a portion of or the entire sensor mount may be fabricated from the polymer composite material as shown and described above herein over-molded onto one or more flexible, reinforcement materials as will be described below herein. In other embodiments, a portion of or the entire vehicle structure or semi-structure may be fabricated from the polymer composite material as shown and described above herein over-molded onto one or more flexible, reinforcement materials as will be described below herein. Examples of the flexible, reinforcement material that may be in-molded within the polymer composite material in one or more of the embodiments shown and described herein include, but are not limited to, woven, continuous glass fiber substrate; continuous glass fiber disposed within a polypropylene substrate; a woven, comingled glass and polypropylene fabric; continuous high-strength steel strands; a woven, continuous polypropylene and fiberglass substrate, combinations thereof, and/or other similar materials providing flexible reinforcement and/or a reduced Maximum G-Load spread to the polymer composite material upon an object impacting the material.

Not to be limited by theory, it is believe that the overmolding of the flexible, reinforcement material within the polymer material assists the polymer material in distributing any loads applied to the polymer material such as, for example, a sudden load applied to a vehicle structure or semi-structure from an impact with an object such as, for example, in a crash or simulated crash test. As such, the material comprising the polymer material over-molded on the flexible reinforcement material reduces the G load spread as compared to the polymer material without the flexible reinforcement material over-molded therein. The term "Maximum G-Load spread," as used herein, means the absolute value of the difference between the positive and negative maximum peaks of the G load measured on a material caused by an impact with an object whether performed during a simulated crash test or during a real vehicle crash. A reduced Maximum G-Load spread of the material means an improved compliance of the material. In certain embodiments herein, the material having the flexible reinforcement material over-molded therein permits the materials compliance to be tunable. In certain examples, the flexible, reinforcement material over-molded within the polymer material extends the tunable window of the polymer material's compliancy or reduces the polymer window's Maximum G-Load spread.

Figure 2:
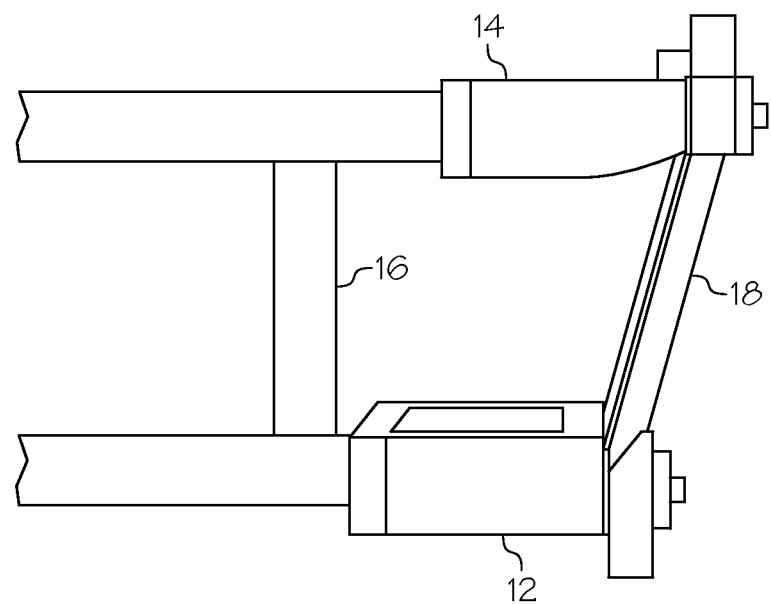
FIG. 2 is a schematic illustration of a side elevational view of the fixture of FIG. 1, post dynamic bending testing.

To determine the Maximum G-Load spread (or compliancy) and/or pulse transmissions of a baseline glass mat thermoplastic material and the polymer composite material over-molded onto the flexible, reinforcement material a dynamic bending and low-speed impact tests were utilized on sample coupons of several of the materials disclosed herein. Referring to FIGS. 1-2, a test fixture 10 used during dynamic bending testing of test material coupons is shown, having two hydraulically-controlled solid cylinders 12, 14 that work independently of each other. The fixture 10 also includes a support 16 connected between the two cylinders 12, 14 to provide support to the second cylinder 14 when it is extended during the operation of the test to bend a coupon 18 of the test material. The coupon 18 is clamped using machine blocks with radii at certain areas to alleviate stress connections during coupon bending. A velocity of 11 miles per hour ("mph") was used to test the baseline and example coupons as set forth herein.

Figure 3:
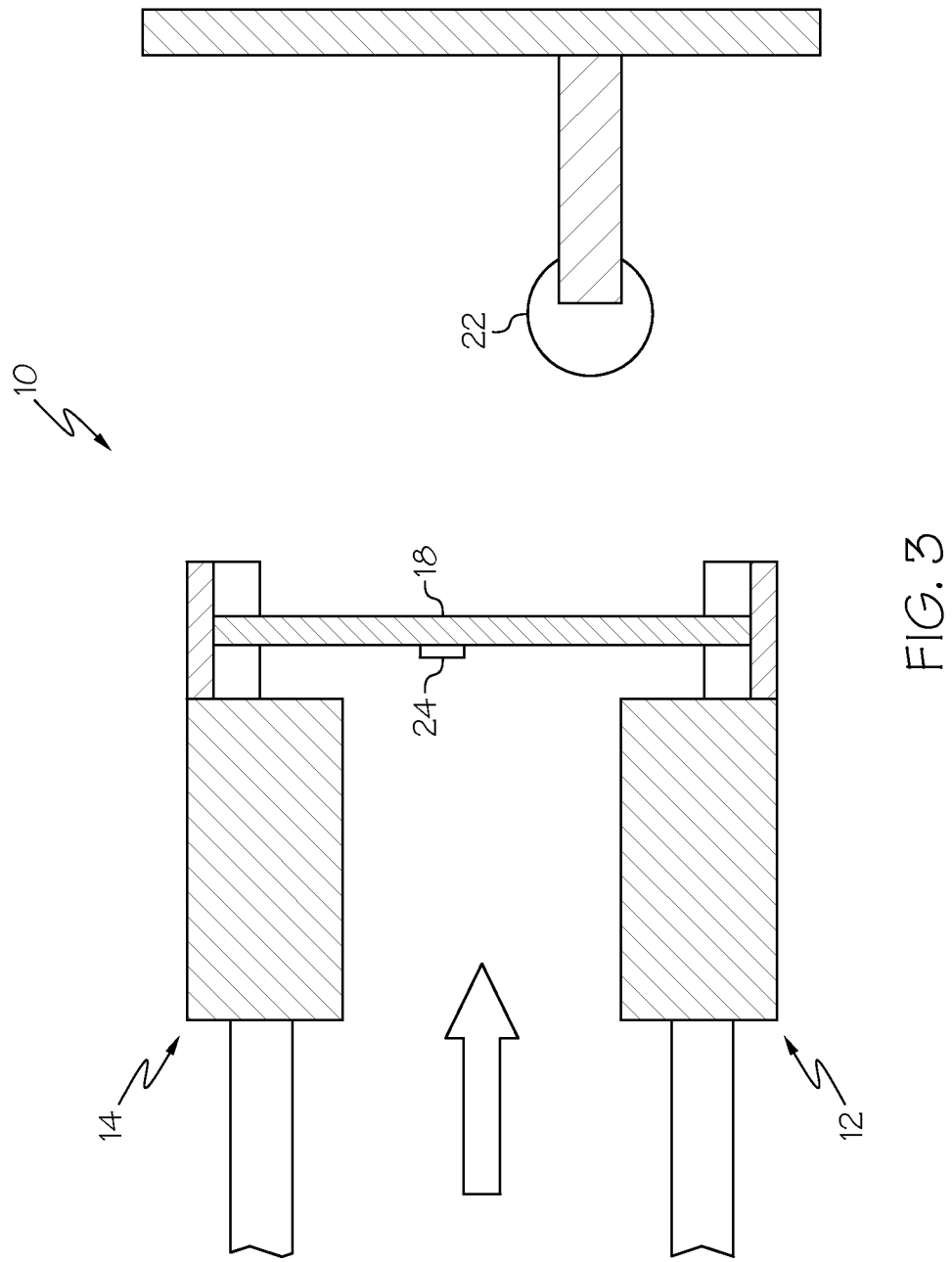
FIG. 3 is a schematic illustration of a side elevational view of a test fixture holding a coupon prior to an impact test.

Referring to FIG. 3, the same fixture 10 used in the dynamic bending tests was used in low speed impact tests by combining it with a stationary, hemispherical impact tip 22 of approximately 45 mm in diameter positioned opposite the coupon and the two cylinders 12, 14. The impact tip 22 is positioned in an off-centered position between the two cylinders 12, 14. Additionally, an accelerometer 24 is positioned in an off-centered position on the coupon relative to the two cylinders, on a side of the coupon 18, opposite the impact tip 22. In one example, the accelerometer is positioned about 10 mm from the center of the coupon 18 and toward the end of the coupon 18 that is opposite the end the impact tip 22 is closest to upon impact with the coupon 18.

Both cylinders 12, 14 are extended outwardly (e.g., to the right in FIGS. 3 and 4) at a velocity of 6 mph until the coupon 18 strikes and/or impacts the impact tip 22, wherein the accelerometer 24 senses, measures, and records the acceleration and/or 0-load of the impact over time.

Figure 4:
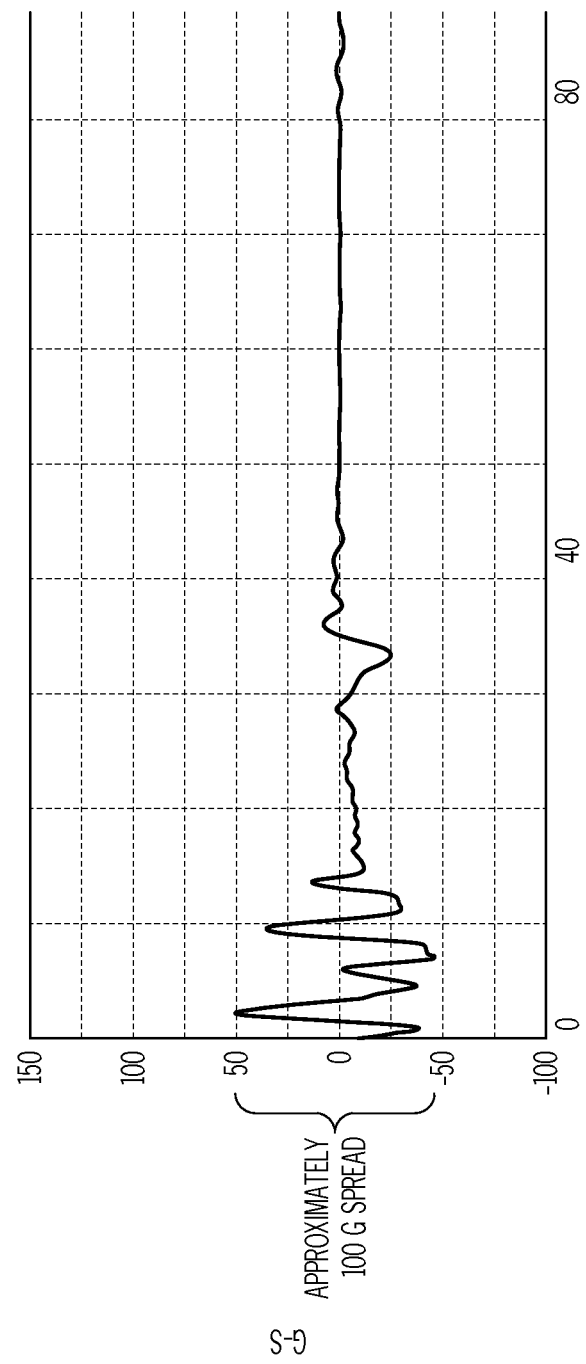
FIG. 4 is a graphical representation of test data results for Example 1.

Referring to FIG. 4, in a first example ("Example 1"), the polymer composite material comprising a glass mat thermoplastic ("GMT") that includes about 30%, by weight, chopped fiber glass mat reinforced polypropylene laminate with randomly oriented glass fibers over-molded onto a flexible, reinforcement material that includes a woven, continuous glass fiber substrate may comprise from about 60%, by weight, to about 70%, by weight, continuous glass fibers disposed within a thin film of polypropylene. The flexible, reinforcement material used in this example is commercially available as Polystrand® from Polystrand, Inc. Corporation. FIG. 4 illustrates the results of impact testing as set forth above herein on the material of Example 1, detailing the G-Load over time from impact to ultimate dissipation of the impact load. FIG. 4 also shows the material of Example 1 comprises a Maximum G-Load spread of about 135 G's.

Figure 5:
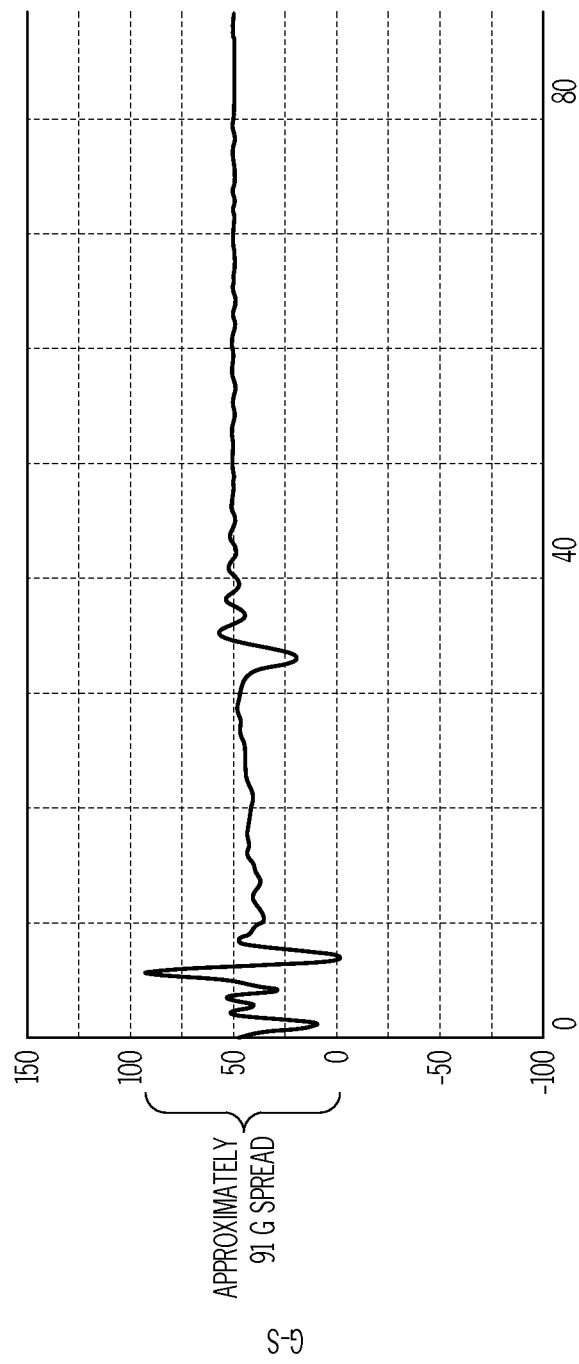
FIG. 5 is a graphical representation of test data results for Example 2.

Referring to FIG. 5, in a second example ("Example 2"), the polymer composite material comprising a glass mat thermoplastic ("GMT") that includes about 30%, by weight, chopped fiber glass mat reinforced polypropylene laminate with randomly oriented glass fibers over-molded onto the flexible reinforcement material that includes a woven, comingled glass and polypropylene fabric. As an example, the woven, comingled glass and polypropylene fabric reinforcement material may comprise from about 60%, by weight, to about 70%, by weight, of comingled glass fibers, and from about 30%, by weight, to about 40%, by weight, of polypropylene fabric. The flexible, reinforcement material used in this example is commercially available as Twintex® from Vetrotex France Corporation. FIG. 5 illustrates the results of impact testing as set forth above herein on the material of Example 2, detailing the G-Load over time from impact to ultimate dissipation of the impact load. FIG. 5 also shows the material of Example 2 comprises a Maximum G-Load spread of about 91 G's.

Figure 6:
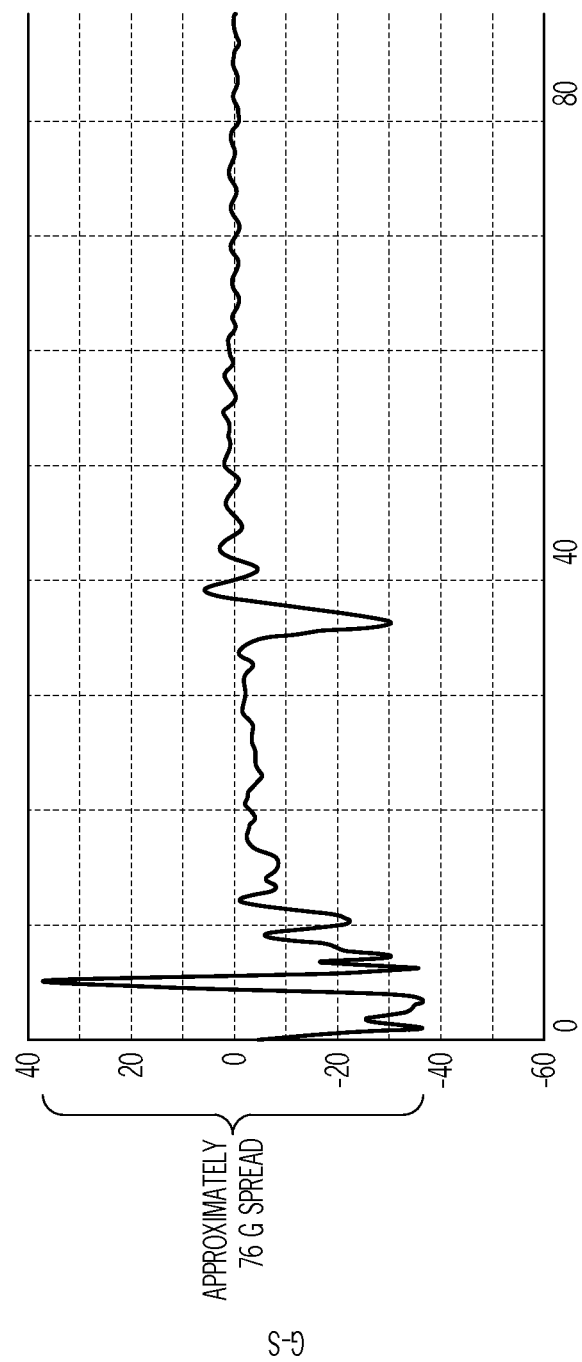
FIG. 6 is a graphical representation of test data results for Example 3.
Figure 7:
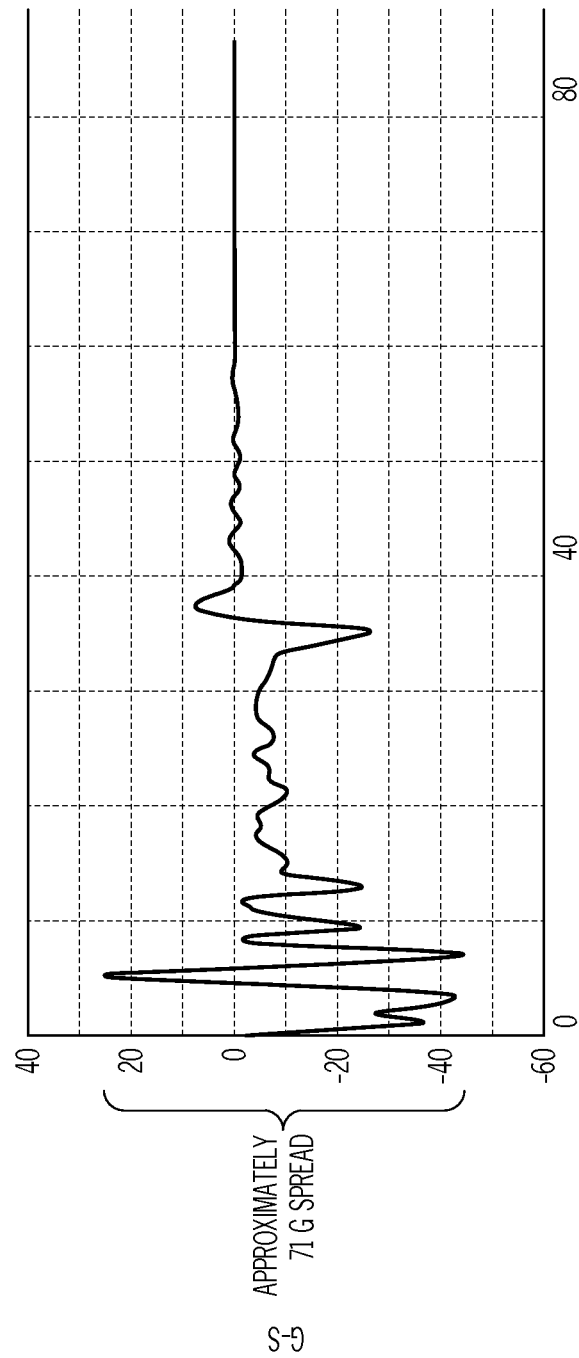
FIG. 7 is a graphical representation of test data results for Example 4.
Figure 8:
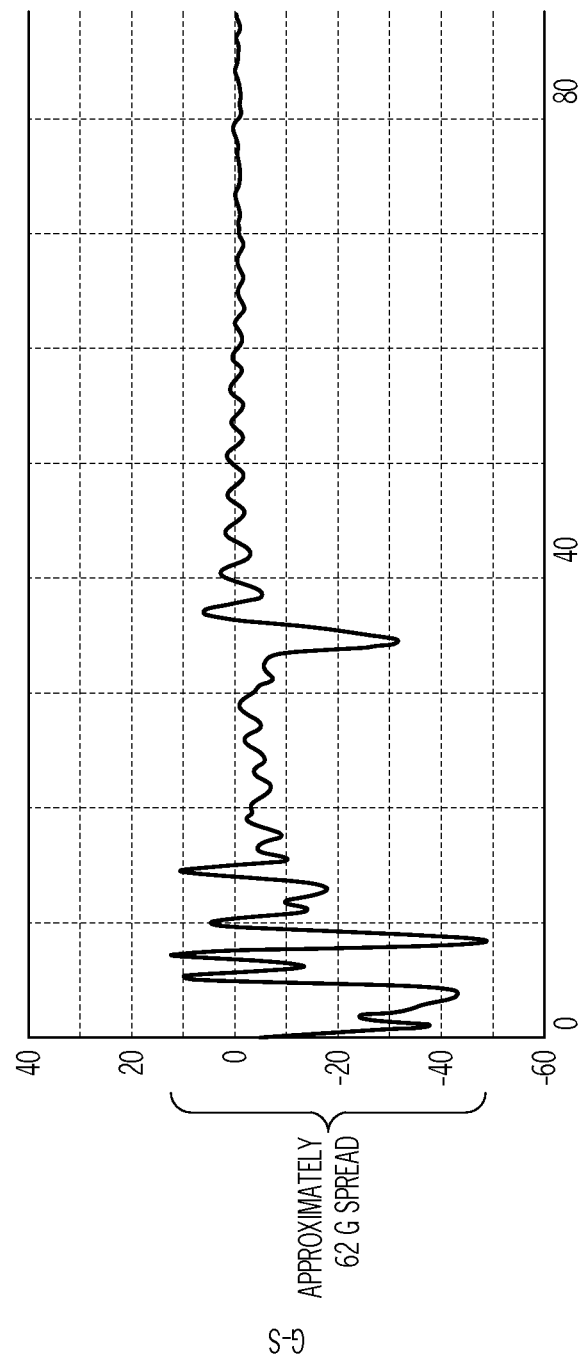
FIG. 8 is a graphical representation of test data results for Example 5.

Referring to FIGS. 6-8, Maximum G-Load spreads for additional examples of a flexible reinforcement material comprising continuous high-strength steel strands over-molded within the polymer composite material are shown. The high strength steel strands may be separate and discrete strands or may comprise a matrix of interconnected continuous high-strength strands. Alternatively, the high-strength strands may be attached to or disposed within a substrate such as, for example, a flexible polypropylene substrate/sheet. Additionally, the flexible reinforcement material may comprise a flexible substrate/sheet and continuous high strength steel strands which are attached to a second flexible substrate/sheet. In a particular example of this embodiment ("Example 3"), the polymer composite material comprising a glass mat thermoplastic ("GMT") that includes about 30%, by weight, chopped fiber glass mat reinforced polypropylene laminate with randomly oriented glass fibers over-molded onto one or more strands of unidirectional, high-strength steel strands having a filament diameter of about 0.3 mm (e.g., about 28 gauge) and a cord diameter of about 0.6 mm. The flexible, reinforcement material(s) used in this example is commercially available as HW ST2-12-12 Hardwire® from Hardwire, LLC. The ST2 wire cord is fabricated by twisting 2 high carbon steel-cord individual filaments together at a medium twist angle. FIG. 6 illustrates the results of impact testing as set forth above herein on the material of Example 3, detailing the G-Load over time from impact to ultimate dissipation of the impact load. FIG. 6 also shows the material of Example 3 comprises a Maximum G-Load spread of about 76 G's.

Referring to FIG. 7, another particular example of this embodiment ("Example 4") is shown. In this Example 4, the polymer composite material comprising a glass mat thermoplastic ("GMT") that includes about 30%, by weight, chopped fiber glass mat reinforced polypropylene laminate with randomly oriented glass fibers over-molded onto one or more strands of unidirectional, high-strength steel strands having a filament diameter of about 0.48 mm (e.g., about 24 gauge). The flexible, reinforcement material(s) used in this example is commercially available as HW 3SX-4-12-GA Hardwire® from Hardwire, LLC. The 3SX wire cord is fabricated by twisting 3 identical high carbon steel individual wire filaments together at a longer than usual lay length and then over-wrapping the bundle with a single filament. FIG. 7 illustrates the results of impact testing as set forth above herein on the material of Example 4, detailing the G-Load over time from impact to ultimate dissipation of the impact load. FIG. 7 also shows the material of Example 4 comprises a Maximum G-Load spread of about 77 G's.

Referring to FIG. 8, another particular example of this embodiment ("Example 5") is shown. In this Example 5, the polymer composite material comprising a glass mat thermoplastic ("GMT") that includes about 30%, by weight, chopped fiber glass mat reinforced polypropylene laminate with randomly oriented glass fibers over-molded onto one or more strands of unidirectional, high-strength steel strands having a filament diameter of about 0.48 mm (e.g., about 24 gauge). The flexible, reinforcement material(s) used in this example is commercially available as HW 3SX2-4-12-GA Hardwire® from Hardwire, LLC. The 3SX wire cord is fabricated by twisting 3 identical high carbon steel individual wire filaments together at a longer than usual lay length and then over-wrapping the bundle with a single filament. FIG. 8 illustrates the results of impact testing as set forth above herein on the material of Example 5, detailing the G-Load over time from impact to ultimate dissipation of the impact load. FIG. 8 also shows the material of Example 5 comprises a Maximum G-Load spread of about 62 G's.

In another example, the polymer composite material comprising a glass mat thermoplastic ("GMT") that includes about 30%, by weight, chopped fiber glass mat reinforced polypropylene laminate with randomly oriented glass fibers over-molded onto a flexible, reinforcement material that includes continuous strands of glass fibers woven with similar continuous strands of glass fibers into a substrate. The flexible, reinforcement material used in this example is commercially available as GMTex® from Quadrant AG Corporation.

In still yet another example, the flexible reinforcement material may comprise galvanized steel wire mesh. As an example, the galvanized steel wire mesh may comprise a welded, galvanized steel wire mesh having about 6.4 mm spacing. However, it is understood that other steel wire meshes may be used having different sizing and/or spacing configurations.

In still yet another example, the flexible reinforcement material may comprise stainless steel wire mesh. As an example, the stainless steel wire mesh may comprise a woven, stainless steel wire mesh having about 6.4 mm spacing. However, it is understood that other steel wire meshes may be used having different sizing and/or spacing configurations.

Figure 9:
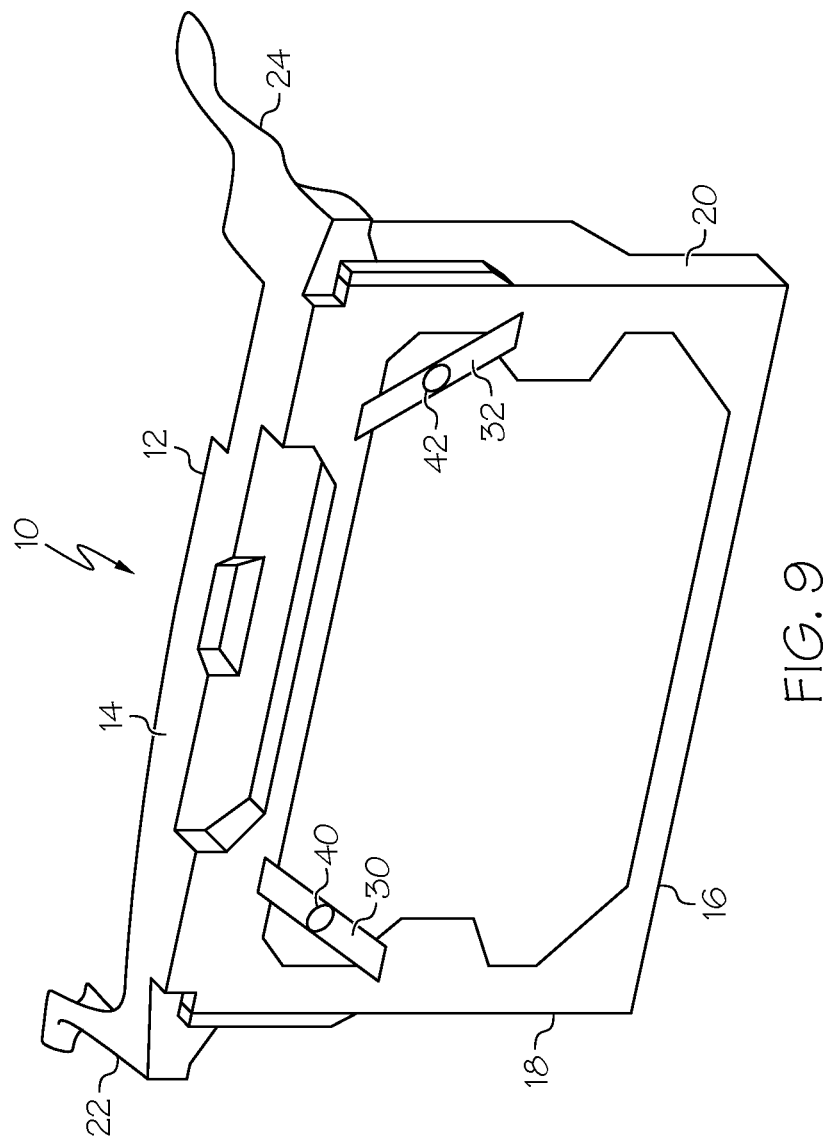
FIG. 9 is a schematic illustration of an isometric view of a bolster assembly having one or more sensor mounts and one or more sensors directly attached to the one or more sensor mounts in accordance with one or more embodiments of the disclosure.
Figure 10:
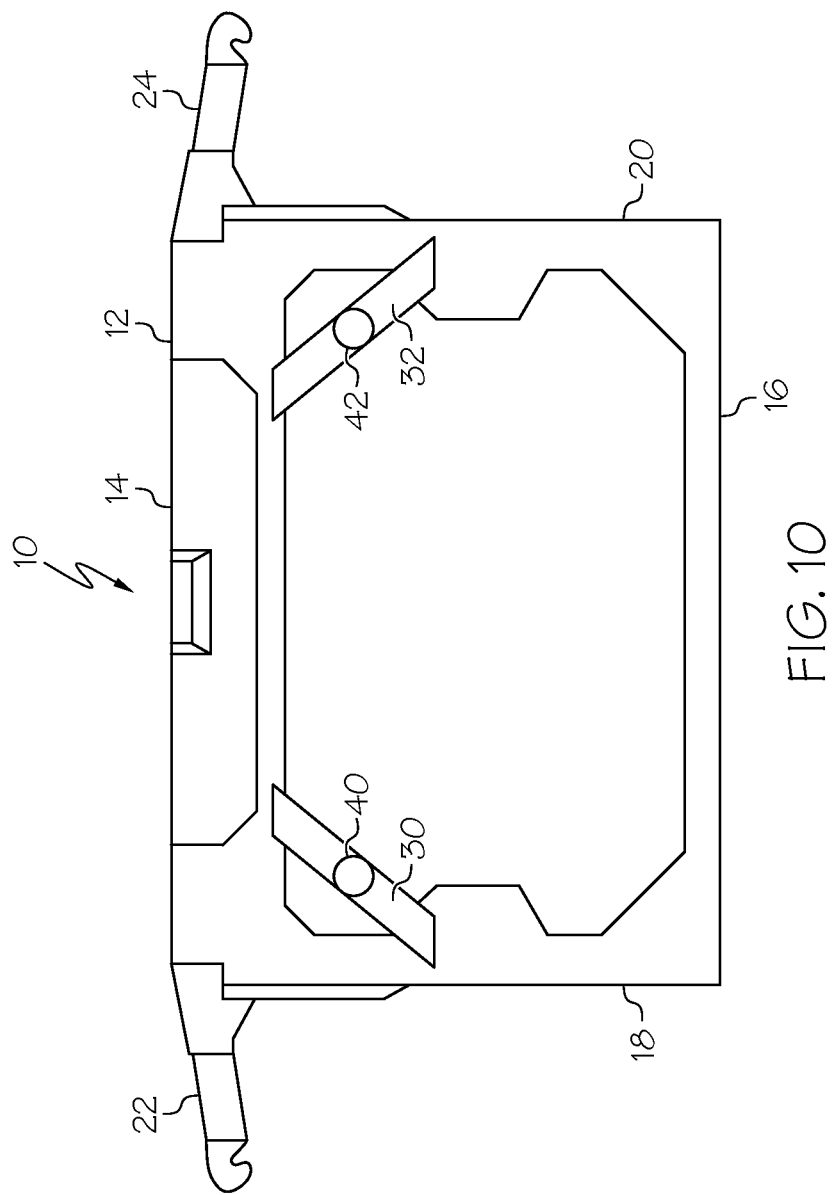
FIG. 10 is a schematic illustration of a front view of the bolster assembly of FIG. 9.

In the one or more embodiments shown and described below, a portion of or the entire sensor mount and/or vehicle structure or semi-structural component such as, for example, a bolster, may comprise one or more of the polymer materials and/or one or more of the flexible, reinforcement materials in-molded within one or more of the polymer materials and/or combinations thereof as set forth above herein. Referring to FIGS. 9 and 10, an example of a sensor mount 30 is shown as part of a vehicle structural or semi-structural component assembly. In the embodiment shown, the sensor mount 30 may comprise a separate component that is removably or fixedly attachable to a vehicle structural or semi-structural component such as, for example, a front end bolster 10 for an automobile, to form a vehicle structural or semi-structural component assembly. In this example, at least a portion of or all of the sensor mount 30 may be fabricated from a polymer composite material and a flexible reinforcement material over-molded within the polymer composite material as set forth above herein.

The sensor mount 30 may be connected to the bolster 10 in any number of positions, configurations, and/or orientations using any number of various, conventional or yet-to-be developed, connections and/or methods of connecting the sensor mount 30 to the bolster 10. As shown, the first sensor mount 30 is connected to a first member 14 and a third member 18 of the bolster. Illustrative connections and/or methods of connecting may include screws, bolt and nut connections, adhesives, snap-fit connections, and/or any combination thereof. In this example, the bolster 10 includes a first member 14, a second member 16 opposed from the first member 14, a third member 18 positioned between and at one end of the first and second members 14,16, and a fourth member 20 opposed from the third member 18 and positioned between and at an end of the first and second members 14,16, opposite the third member 18. The first and second members 14,16 are substantially perpendicular to the third and fourth members 18,20. It is understood that the bolster 10 may comprise any number of a variety of shapes, configurations, and/or designs. It is understood that the first, second, third, and fourth members may be individual components connected together using any number of a variety of conventional connection devices or all molded as a single, integral component using known molding methods such as, for example, a compression molding process.

In the embodiment shown, a second optional sensor mount 32 may be connected to the bolster 10 just as or similar to the first sensor mount 30 as shown and described above herein. For example, the second sensor mount 32 is connected to the first member 14 and a fourth member 20 of the bolster as shown in FIGS. 9-10. In this example, at least a portion of the second sensor mount 32 or the entire second sensor mount 32 may be fabricated from a polymer composite material and a flexible reinforcement material over-molded within the polymer composite material as set forth above herein.

The vehicle structural or semi-structural component assembly may also include a first sensor 40 mounted, connected, and/or attached on and/or to the first sensor mount 30 (e.g., a crash detection assembly). The first sensor mount 30 may comprise a surface that the sensor 40 is mounted on using adhesive. In another embodiment, a separate bracket (not shown) may be attached to the sensor mount 30 and operable to connect the sensor 40 to the sensor mount 30. This bracket may be fabricated from a material that is either the same as or different from (e.g., metal, etc.) the material of the sensor mount 30. In another embodiment, the first sensor 40 may be mounted to the respective sensor mount 30 via a first aperture (not shown) disposed therein such that the first sensor 40 may be inserted into the respective aperture and attached thereto. The first sensor 40 may be attached to the respective apertures using adhesive, snap-fit connections, conventional connections, interference fit, and/or any other type of connections. In yet another embodiment, the first sensor mount 30 may each comprise a bracket or snap-fit connector configured to receive and/or hold the first sensor 40. Although, a single sensor (sensor 40) is described as being connected and/or mounted to the first sensor mount 30, additional sensors may be connected and/or mounted thereon as well. It should be understood that any conventional or yet-to-be developed, connection and/or method of connection may be used herein to connect the sensor to the sensor mount of the bolster.

In addition, a second, optional sensor 42 may be mounted on the second sensor mount 32 of the vehicle structural or semi-structural assembly. The second sensor mount 32 may comprise a surface that the sensor 42 is mounted on using adhesive. In another embodiment, a separate bracket (not shown) may be attached to the sensor mount 32 and operable to connect the sensor 42 to the sensor mount 32. This bracket may be fabricated from a material that is either the same as or different from (e.g., metal, etc.) the material of the sensor mount 32. In another embodiment, the first sensor 42 may be mounted to the respective sensor mount 32 via a first aperture (not shown) disposed therein such that the first sensor 42 may be inserted into the respective aperture and attached thereto. The first sensor 42 may be attached to the respective apertures using adhesive, snap-fit connections, conventional connections, interference fit, and/or any other type of connections. In yet another embodiment, the first sensor mount 32 may each comprise a bracket or snap-fit connector configured to receive and/or hold the first sensor 42. Although, a single sensor (sensor 40) is described as being connected and/or mounted to the first sensor mount 32, additional sensors may be connected and/or mounted thereon as well. It should be understood that any conventional connection and/or method of connection may be used herein to connect the sensor to the sensor mount of the bolster. It should also be understood that one or more sensors may be mounted on one or both of the sensor mounts and/or on any other portion of the vehicle structure or semi-structure component (e.g., the bolster).

Figure 11:
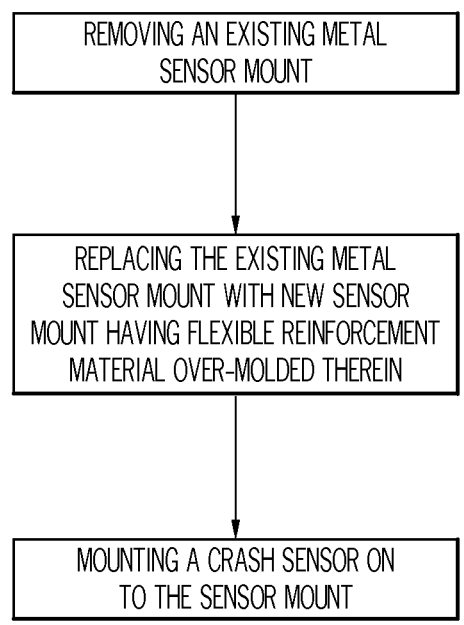
FIG. 11 is an illustration of a method of mitigation crash sensor pulses in accordance with one or more embodiments of the disclosure.

In one example of using the embodiment shown in FIGS. 9-10, an existing bolster (e.g., the bolster 10) installed in a vehicle may be retrofitted to include the first sensor mount 30 and/or the second sensor mount 32 as illustrated by the process in FIG. 11. In particular, the existing bolster may include, for example, an existing, first metal sensor mount (not shown) and/or an existing second, metal sensor mount (not shown) that are attached to the bolster in any number of various locations. These existing first and second sensor metal mounts may be fabricated from a variety of metals. In this example, the existing, first metal sensor mount (not shown) and/or the existing, second metal sensor mount (not shown) may be removed or detached from the bolster 10 and replaced with the first sensor mount 30 and/or second sensor mount 32, respectively, fabricated from one or more of the polymer composite materials having one or more of the flexible, reinforcement materials in-molded therein as set forth above herein such that the first and second sensor mounts 30,32 are attached to the bolster 10 as shown and described herein. Additionally, the first sensor 40 and/or the second sensor 42 may be mounted to the first and second sensor mounts 30,32, respectively. It should be understood that any number of additional sensor mounts may be included along the bolster 10 and any number of sensors may be mounted to the respective sensor mounts at any number of locations along the bolster 10.

Figure 12:
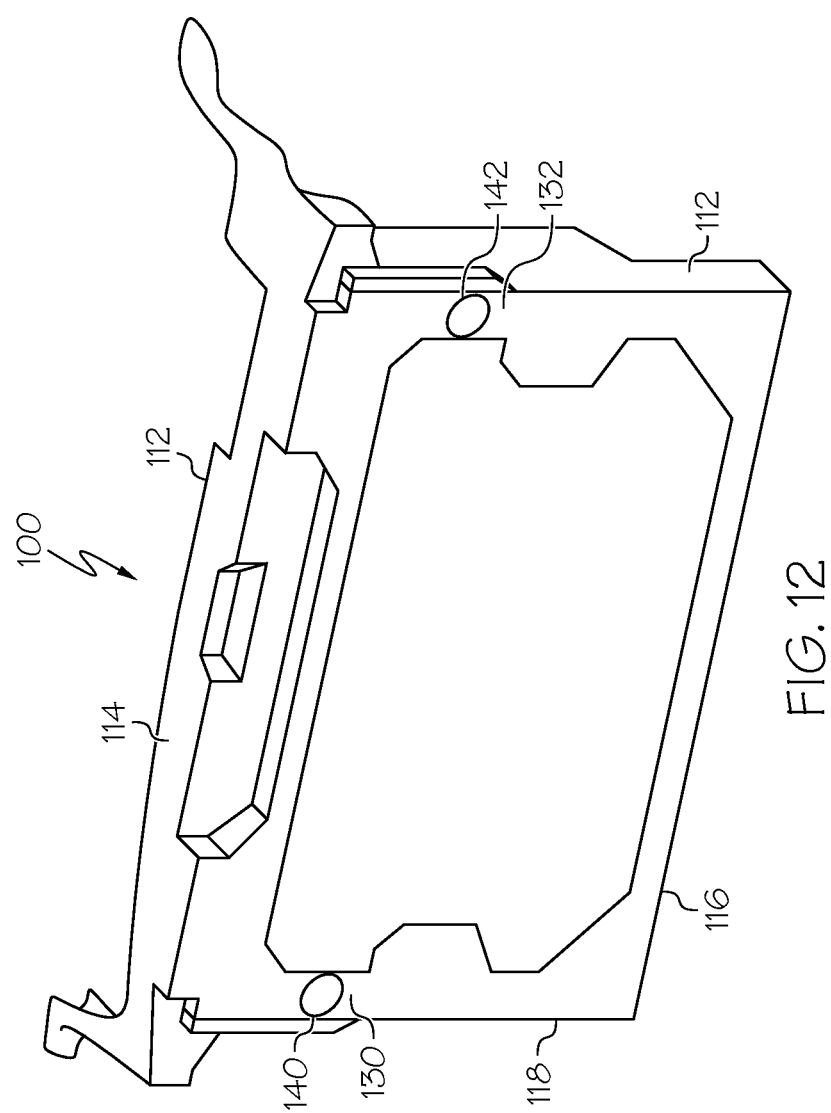
FIG. 12 is a schematic illustration of an isometric view of another embodiment of a bolster assembly having one or more sensor mounts and one or more sensors directly attached to the one or more sensor mounts in accordance with one or more embodiments of the disclosure.
Figure 13:
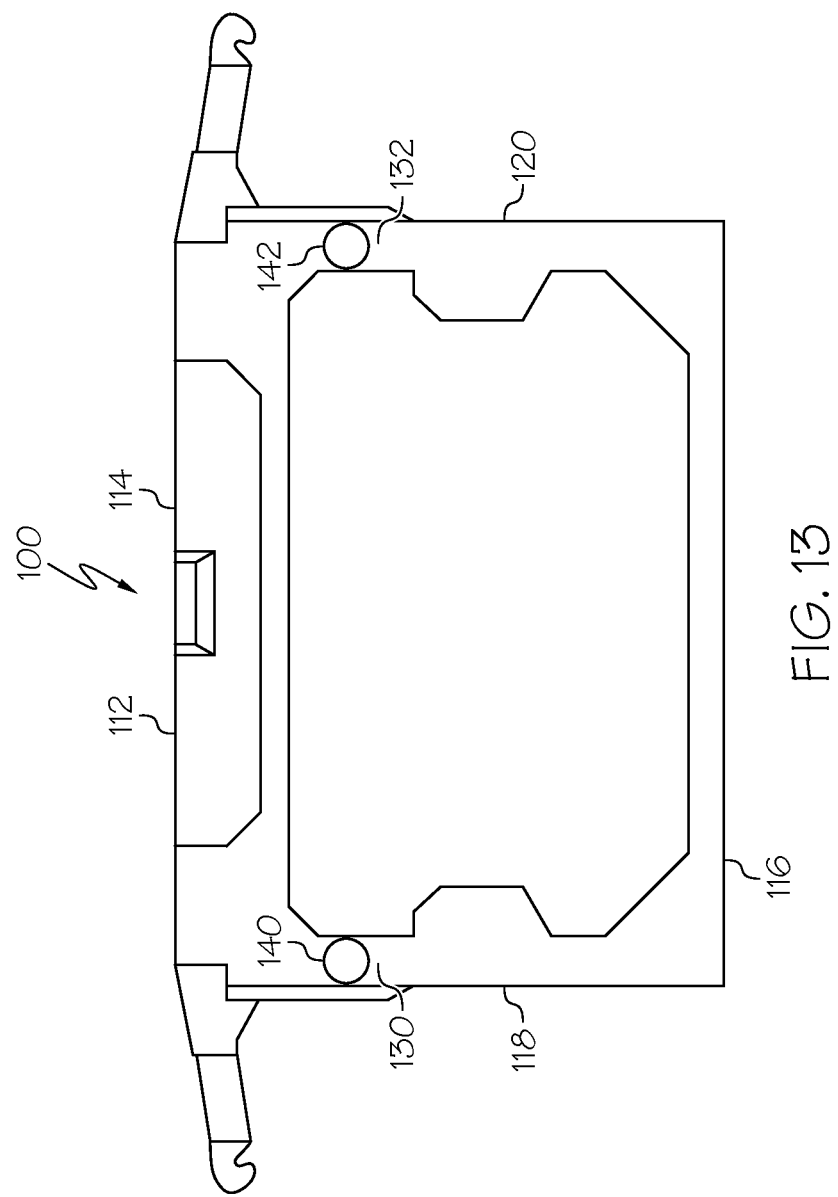
FIG. 13 is a schematic illustration of a front view of the bolster assembly of FIG. 12.

Referring to FIGS. 12 and 13, another embodiment of a vehicle structural or semi-structural component assembly is shown as a bolster assembly 100. In this example, the bolster assembly 100 may be fabricated and/or molded from a base polymer composite material such as, for example, glass mat thermoplastic and/or any other reinforced polymer. The bolster assembly 100 may include an integral body 112 having a first member 114, a second member 116 substantially opposed from the first member 114, a third member 118 connected between and at one end of the first and second members 114,116, and a fourth member 120 connected between and at an end of the first and second members 114,116 opposite the third member. A portion or the entire third member 118 may be fabricated by also in-molding a flexible reinforcement material as shown and described herein within the base polymer composite material as shown and described herein to form a sensor mount 130. The polymer composite material and the flexible reinforcement material in-molded within the polymer composite material may comprise any of the materials set forth above herein or combinations thereof.

A first sensor 140 may be mounted on the first sensor mount 130. The first sensor mount 130 may comprise a surface that the sensor 140 is mounted on using adhesive. In another embodiment, a separate bracket (not shown) may be attached to the sensor mount 130 and operable to connect the sensor 140 to the sensor mount 130. This bracket may be fabricated from a material that is either the same as or different from (e.g., metal, etc.) the material of the sensor mount 130. In another embodiment, the first sensor 140 may be mounted to the respective sensor mount 130 via a first aperture (not shown) disposed therein such that the first sensor 140 may be inserted into the respective aperture and attached thereto. The first sensor 140 may be attached to the respective apertures using adhesive, snap-fit connections, conventional connections, interference fit, and/or any other type of connections. In yet another embodiment, the first sensor mount 130 may each comprise a bracket or snap-fit connector configured to receive and/or hold the first sensor 140. Although, a single sensor (sensor 140) is described as being connected and/or mounted to the first sensor mount 130, additional sensors may be connected and/or mounted thereon as well. It should be understood that any conventional connection and/or method of connection may be used herein to connect the sensor to the sensor mount of the bolster.

In addition, the bolster assembly 100 may include a second, optional sensor mount 132. For example, a portion or the entire fourth member 120 may be fabricated by also over-molding a flexible reinforcement material as shown and described herein within the base polymer composite material as shown and described herein to form the second sensor mount 132. The polymer composite material and the flexible reinforcement material over-molded within the polymer composite material may comprise any of the materials set forth above herein or combinations thereof.

In addition, a second, optional sensor 142 may be mounted on the second sensor mount 132. The second sensor mount 132 may comprise a surface that the sensor 142 is mounted on using adhesive. In another embodiment, a separate bracket (not shown) may be attached to the sensor mount 132 and operable to connect the sensor 142 to the sensor mount 132. This bracket may be fabricated from a material that is either the same as or different from (e.g., metal, etc.) the material of the sensor mount 132. In another embodiment, the first sensor 142 may be mounted to the respective sensor mount 132 via a first aperture (not shown) disposed therein such that the first sensor 142 may be inserted into the respective aperture and attached thereto. The first sensor 142 may be attached to the respective apertures using adhesive, snap-fit connections, conventional connections, interference fit, and/or any other type of connections. In yet another embodiment, the first sensor mount 132 may each comprise a bracket or snap-fit connector configured to receive and/or hold the first sensor 142. Although, a single sensor (sensor 140) is described as being connected and/or mounted to the first sensor mount 132, additional sensors may be connected and/or mounted thereon as well. It should be understood that any conventional connection and/or method of connection may be used herein to connect the sensor to the sensor mount of the bolster. Moreover, although the first and second sensor mounts 130,132 are shown as part of the third and fourth members 118,120, it is understood that the flexible reinforcement material may be over-molded anywhere (i.e., at any location, localized positions, etc.) along the bolster assembly 100 to form the one or more sensor mounts or along the entire bolster.

Figure 14:
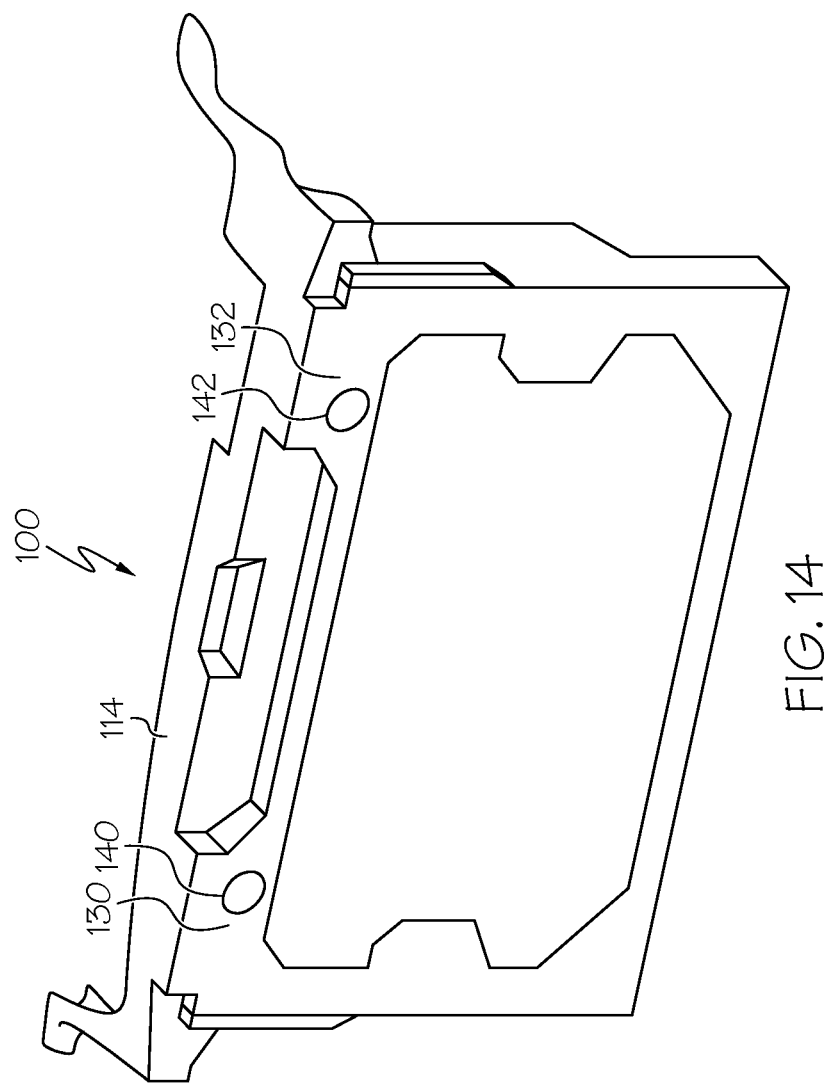
FIG. 14 is a schematic illustration of an isometric view of another embodiment of a bolster assembly having one or more sensor mounts and one or more sensors directly attached to the one or more sensor mounts in accordance with one or more embodiments of the disclosure.
Figure 15:
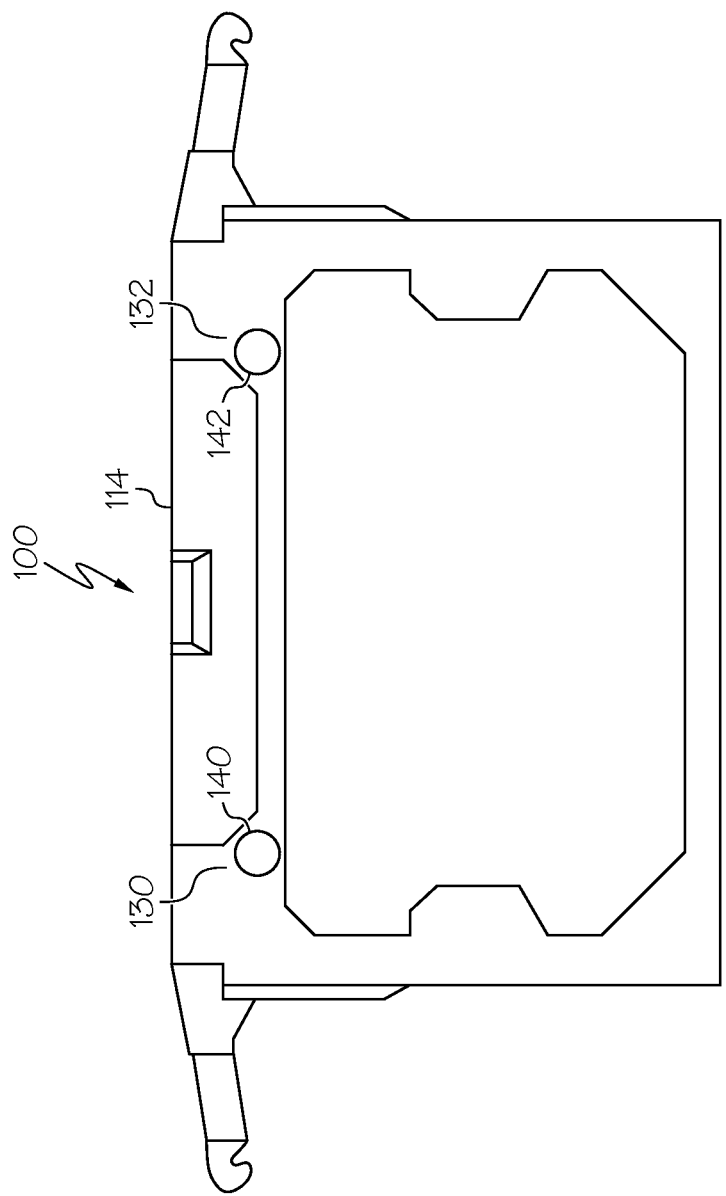
FIG. 15 is a schematic illustration of a front view of the bolster assembly of FIG. 14.

For example, referring to FIGS. 14 and 15, another embodiment of a vehicle structural or semi-structural assembly 100 is shown. In this embodiment, the bolster assembly 100 is shown, wherein the first member 114 includes the first sensor mount 130 and the second sensor mount 132 rather than the third and fourth members 118,120, respectively, as shown in FIGS. 12 and 13. In this example shown in FIGS. 14 and 15, the first member 114 is fabricated from one or more of the polymer composite materials set forth herein and a flexible reinforcement material as set forth herein over-molded within the polymer material to form the first and second sensor mounts 130,132. The flexible reinforcement material may be over-molded only in those localized positions of the first member 114. In other words, the first member 114 may not include the flexible reinforcement material over-molded throughout the entire first member. Alternatively, the flexible reinforcement material may be non-localized in that the flexible reinforcement material may be over-molded along the entire first member 114. The polymer composite material and the flexible reinforcement material over-molded within the polymer composite material may comprise any of the materials set forth above herein or combinations thereof.

As shown in FIGS. 14 and 15, the first and second sensor mounts 140,142 may be mounted onto the first and second sensor mounts 130,132, respectively, using any of the mounting connections and/or methods as described above herein with reference to any of the embodiments shown and described herein. The bolster 100 in FIGS. 14 and 15 may include some or the entire same or similar components as the embodiment shown and described with reference to FIGS. 12 and 13.

Figure 16:
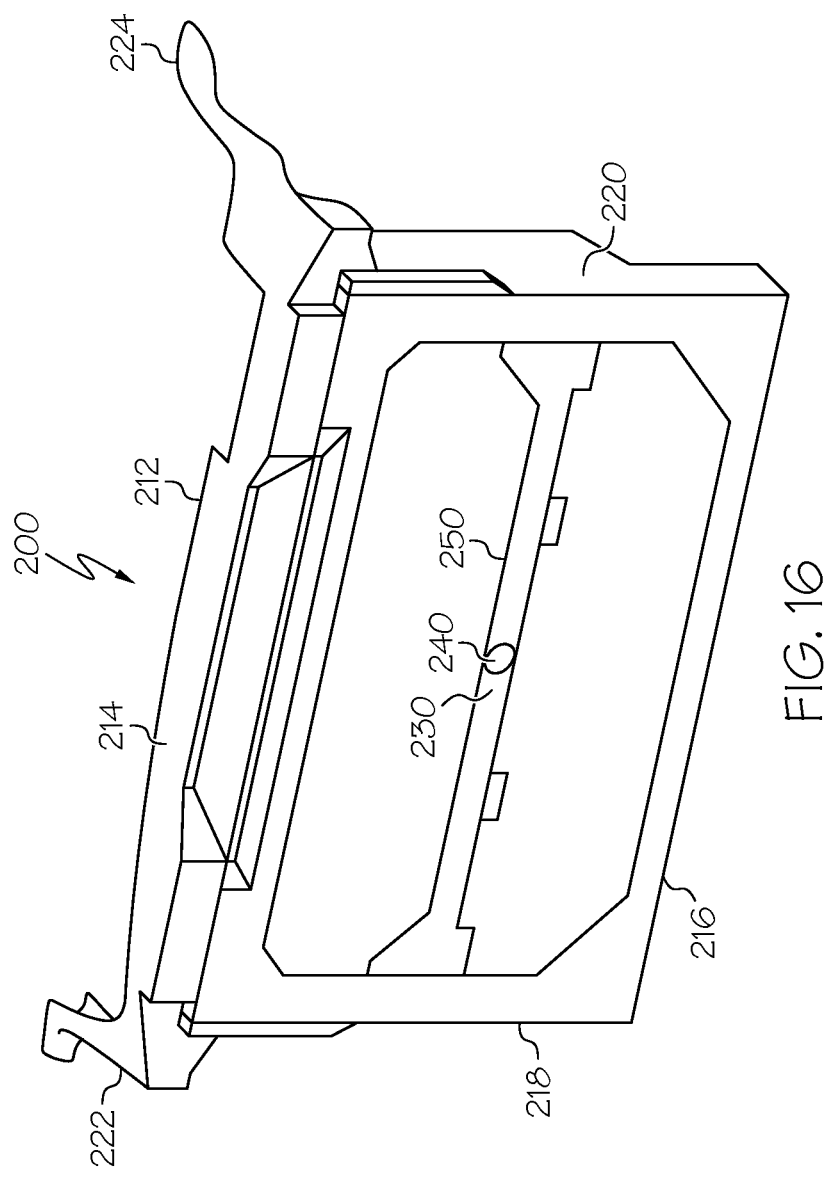
FIG. 16 is a schematic illustration of an isometric view of another embodiment of a bolster assembly having one or more sensor mounts and one or more sensor directly attached to the one or more sensor mounts in accordance with one or more embodiments of the disclosure.
Figure 17:
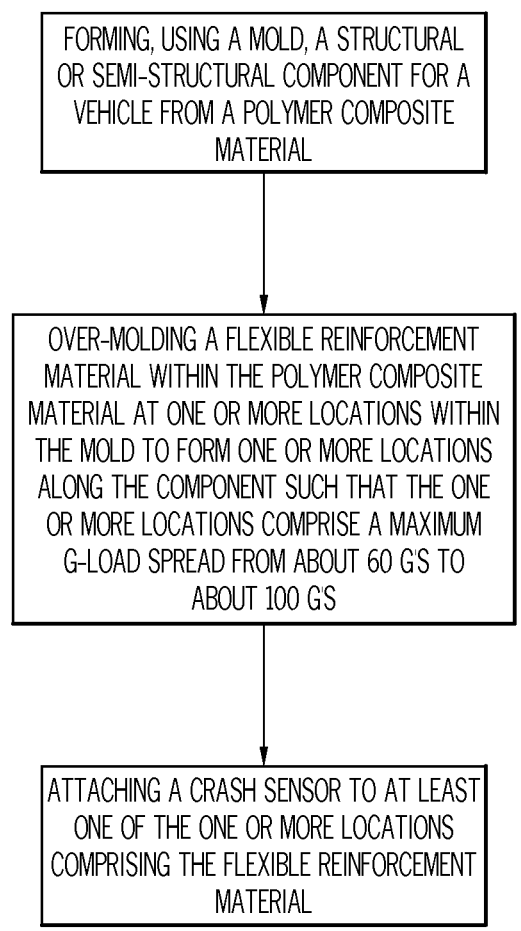
FIG. 17 is an illustration of a method for enabling tunable deceleration characteristics in a vehicle structural or semi-structural component in accordance with one or more embodiments of the disclosure.

Referring to FIG. 16, another embodiment of a vehicle structural or semi-structural component assembly is shown as a bolster assembly 200. Similar to the other embodiments shown and described herein, the bolster assembly 200 may be fabricated and/or molded from one or more of the polymer composite material set forth herein. The bolster may include an integral body 212 having a first member 214, a second member 216 substantially opposed from the first member 214, a third member 218 connected between and at one end of the first and second members 214, 216, and a fourth member 220 connected between and at an end of the first and second members 214, 216 opposite the third member. As shown in FIG. 16, the body 212 may also include a cross member 250 that is connected between the third and fourth members 218, 220, respectively, and is oriented substantially parallel and between the first and second members 214, 216, respectively. It should be understood that the cross member 250 may be positioned in any orientation relative to the first through fourth members, including but not limited to oriented such that it is connected between the first and second members 214, 216, respectively, and oriented substantially parallel to the third and fourth members 218, 220, respectively.

A portion or the entire cross member 250 may be fabricated by one or more of the flexible reinforcement materials set forth herein and over-molded within one or more of the polymer composite materials set forth here to form a sensor mount 230. The polymer composite material and the flexible reinforcement material over-molded within the polymer composite material may comprise any of the materials set forth above herein or combinations thereof.

Additionally, the cross member 250 may include additional sensor mounts and/or sensors mounted thereon. For example, the cross member 250 may be fabricated such that the entire cross member includes the flexible reinforcement material over-molded within the polymer composite material such that the entire cross member 250 is a sensor mount. As such, two or more sensors may be mounted on the cross member 250 anywhere along the cross member 250.

In another embodiment, the body 212 may include additional sensor mounts fabricated from the flexible reinforcement material as set forth herein over-molded within the polymer composite material as set forth herein. As an example, over-and-above the sensor mount 230 and sensor 240 mounted thereon of the body 212, a portion of first member 214 may also comprise a sensor mount (not shown) fabricated from one or more of the flexible reinforcement materials set forth herein over-molded within one or more of the polymer composite materials set forth above herein and a second sensor (not shown) mounted thereon.

It should be understood that the sensor mount locations and/or sensor locations shown in the embodiments of FIGS. 9, 10, and FIGS. 12-16 are just for illustrative purposes. As such, it is understood that one or more of the components of any one of these illustrative embodiments may be interchanged, added to, and/or combined with any one of the other embodiments to form additional embodiments. It should also be understood that the vehicle structural or semi-structural component may be fabricated such that a substantial portion or the entire body (e.g., 12, 112, 212) may comprise the flexible reinforcement material as described above herein over-molded within a polymer composite material as also described above herein to provide either a substantial portion of or the entire body (e.g., 12, 112, 212) with an increased compliance and/or ductility and thus a reduced Max G-Load spread.

For the purposes of describing and defining the subject matter of the disclosure it is noted that the term "substantially" is utilized herein to represent the inherent degree of uncertainty that may be attributed to any quantitative comparison, value, measurement, or other representation.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the embodiments disclosed herein should be construed to include everything within the scope of the appended claims and their equivalents.

What is claimed is:

1. A vehicle bolster having a body, the body comprising:
 a first portion comprising a first member, a second member opposed from the first member, a third member positioned between and at one end of the first and second members, a fourth member opposed from the third member and positioned between and at an end of the first and second members opposite the third member, the first portion of the body fabricated from a polymer composite material, and
 a sensor mount portion connected to the first member and the third member of the bolster, the sensor mount portion comprising a polymer composite material and a flexible reinforcement material over-molded onto the polymer composite material, and a sensor directly attached to the sensor mount portion.

2. The bolster of claim 1, wherein the sensor mount portion does not include a monolithic metal plate.

3. The bolster of claim 1, wherein the sensor mount portion has a Maximum G-Load spread of less than or equal to about 100 G's.

4. The bolster of claim 3, wherein the mount comprises a Maximum G-Load spread from about 1 G to about 100 G's.

5. The bolster of claim 4, wherein the mount comprises a Maximum G-Load spread from about 40 G's to about 100 G's.

6. The bolster of claim 5, wherein the mount comprises a Maximum G-Load spread from about 60 G's to about 100 G's.

7. The bolster of claim 1, wherein the flexible reinforcement material is a material selected from the group consisting of a woven, continuous glass fiber substrate; a continuous glass fiber within a polypropylene substrate; a woven, comingled glass and polypropylene fabric; continuous high-strength steel strands; a woven, continuous polypropylene and fiberglass substrate; and any combination thereof.

8. The bolster of claim 1, wherein the flexible reinforcement material comprises a plurality of individual, unidirectional continuous high-strength strands.

9. The bolster of claim 1, wherein the flexible reinforcement material comprises a flexible substrate and continuous high-strength steel strands attached to the flexible substrate.

10. The bolster of claim 1, wherein the flexible reinforcement material comprises a matrix of continuous high-strength steel strands interconnected with each other.

11. The bolster of claim 1, wherein the polymer composite material comprises glass mat polymer.

12. The bolster of claim 1, wherein the sensor mount portion is a first sensor mount portion, wherein the body further comprises a second sensor mount portion connected to the first and fourth members of the bolster, wherein a second sensor is mounted on the second sensor mount portion, and wherein the second sensor mount portion is fabricated from a polymer composite material and a flexible reinforcement material over-molded onto the polymer composite material.

13. The bolster of claim 1, wherein the body further comprises a cross member connected between the third and fourth members of the bolster, and wherein a portion of the cross member or the entire cross member includes a flexible reinforcement material over-molded onto a polymer composite material.

14. A method, comprising:
 forming, using a mold, a structural or semi-structural component for a vehicle from a polymer composite material comprising a glass mat thermoplastic which includes a chopped fiber glass mat reinforced polypropylene laminate with randomly oriented glass fibers, the component comprising a first member;
 positioning a flexible reinforcement material within the mold; and
 over-molding the flexible reinforcement material onto the first member only at one or more localized positions on the first member, and not on the entire first member, to form one or more sensor mount portions at the one or more localized positions.

15. The method of claim 14, wherein the one or more sensor mount portions do not include a monolithic metal plate.

16. The method of claim 14, wherein the flexible reinforcement material is a material selected from the group consisting of a woven, continuous glass fiber substrate; a continuous glass fiber within a polypropylene substrate; a woven, comingled glass and polypropylene fabric; continuous high-strength steel strands; a woven, continuous polypropylene and fiberglass substrate; and any combination thereof.

17. The method of claim 14, wherein the flexible reinforcement material comprises a plurality of individual, unidirectional continuous high-strength strands attached to a flexible substrate.

18. A method for a vehicle structural or semi-structural component assembly, the method comprising:
forming, using a mold, a structural or semi-structural component for a vehicle from a polymer composite material, the component comprising a first member, a second member opposed from the first member, a third member positioned between and at one end of the first and second members, a fourth member opposed from the third member and positioned between and at an end of the first and second members opposite the third member, and a cross member connected between the third and fourth members;
over-molding a flexible reinforcement material onto the polymer composite material at one or more locations within the mold to form one or more locations along the cross member; and
directly attaching a sensor to the flexible reinforcement material at at least one of the one or more locations along the cross member.

19. The method of claim 18, wherein the one or more locations along the cross member comprising the flexible reinforcement material comprise a Maximum G-Load spread from about 1 G's to about 100 G's.

20. The method of claim 18, wherein the flexible reinforcement material is over-molded onto the entire cross member such that the entire cross member is a sensor mount, and wherein the sensor mount does not include a monolithic metal plate.

21. The method of claim 18, wherein the flexible reinforcement material is a material selected from the group consisting of a woven, continuous glass fiber substrate; a continuous glass fiber within a polypropylene substrate; a woven, comingled glass and polypropylene fabric; continuous high-strength steel strands; a woven, continuous polypropylene and fiberglass substrate; and any combination thereof.

22. A method of retrofitting a vehicle structural or semi-structural component assembly, the method comprising:
removing an existing metal sensor mount from an existing vehicle structural or semi-structural component;
replacing the existing metal sensor mount with a new sensor mount comprising a glass mat thermoplastic having a flexible reinforcement material over-molded therein, the glass mat thermoplastic including a chopped fiber glass mat reinforced polypropylene laminate with randomly oriented glass fibers; and
mounting a crash sensor on the new sensor mount.

23. The method of claim 22, wherein the new sensor mount does not include a monolithic metal plate, and wherein the crash sensor comprises one or more of an accelerometer, a pressure transducer, a thermocouple, a load cell, a deflection sensor, and a contact sensor.

* * * * *